United States Patent
Yoshida

(10) Patent No.: US 8,334,882 B2
(45) Date of Patent: Dec. 18, 2012

(54) LIQUID CRYSTAL DISPLAY APPARATUS

(75) Inventor: Hidefumi Yoshida, Tokyo (JP)

(73) Assignee: Sony Corporation (JP)

( * ) Notice: Subject to any disclaimer, the term of this patent is extended or adjusted under 35 U.S.C. 154(b) by 651 days.

(21) Appl. No.: 12/383,731

(22) Filed: Mar. 26, 2009

(65) Prior Publication Data
US 2009/0262147 A1     Oct. 22, 2009

(30) Foreign Application Priority Data
Mar. 27, 2008   (JP) ................. P2008-083169

(51) Int. Cl.
*G09G 5/10*     (2006.01)
(52) U.S. Cl. .............. 345/690; 345/691; 345/692
(58) Field of Classification Search ......... 345/690–694, 345/204, 84–103, 212, 213; 349/144, 110, 349/38, 43, 42; 348/441, 790, 243, 56, E13.03, 348/E13.033, E13.044; 438/133; 313/503–506, 313/598
See application file for complete search history.

(56) References Cited

U.S. PATENT DOCUMENTS

| | | | |
|---|---|---|---|
| 6,512,502 B2 * | 1/2003 | Ho et al. ................... | 345/84 |
| 6,879,357 B2 * | 4/2005 | Mima ........................ | 349/110 |
| 7,471,274 B2 * | 12/2008 | Kim .......................... | 345/88 |
| 7,907,131 B2 * | 3/2011 | Su et al. .................... | 345/204 |
| 7,982,702 B2 * | 7/2011 | Kamada et al. ........... | 345/89 |
| 8,072,403 B2 * | 12/2011 | Hsieh et al. ............... | 345/87 |
| 2002/0000958 A1 * | 1/2002 | Ho et al. ................... | 345/84 |
| 2005/0083353 A1 * | 4/2005 | Maruyama et al. ....... | 345/690 |
| 2005/0099378 A1 * | 5/2005 | Kim .......................... | 345/99 |
| 2005/0122441 A1 * | 6/2005 | Shimoshikiryoh ........ | 349/38 |
| 2007/0018927 A1 * | 1/2007 | Kim .......................... | 345/92 |
| 2007/0064020 A1 * | 3/2007 | Credelle et al. ........... | 345/694 |
| 2007/0070008 A1 | 3/2007 | Shin et al. | |
| 2007/0211007 A1 * | 9/2007 | Su et al. .................... | 345/92 |

(Continued)

FOREIGN PATENT DOCUMENTS

| JP | 2002333870 A | 11/2002 |
|---|---|---|
| JP | 2005004212 A | 1/2005 |

(Continued)

OTHER PUBLICATIONS

Office Action from Japanese Application No. 2008-083169, dated Aug. 4, 2010.

*Primary Examiner* — Prabodh M Dharia
(74) *Attorney, Agent, or Firm* — Lerner, David, Littenberg, Krumholz & Mentlik, LLP

(57) ABSTRACT

The present invention provides a liquid crystal display apparatus realizing an improved view angle characteristic of luminance and higher response speed. A sub-pixel group is provided with a plurality of sub-pixels. At the time of display driving on liquid crystal elements of each pixel, space-divisional-driving which allows each of the first and the second sub-pixels to be driven separately is performed. By the space-divisional-driving, fluctuations in the gamma characteristic in the case of seeing a display screen from an oblique direction are effectively dispersed, and the view angle characteristic of luminance improves. Area of the first sub-pixel is set to be smaller than whole area of the sub-pixel group. As a result, the drive voltage to be applied to the first sub-pixel at the time of lower gray level becomes high, and response speed improves.

12 Claims, 11 Drawing Sheets

U.S. PATENT DOCUMENTS

| | | | |
|---|---|---|---|
| 2007/0236517 A1* | 10/2007 | Kimpe | 345/690 |
| 2007/0269936 A1* | 11/2007 | Tanaka et al. | 438/133 |
| 2008/0068314 A1* | 3/2008 | Hsieh et al. | 345/87 |
| 2008/0224980 A1* | 9/2008 | Senda et al. | 345/96 |
| 2008/0272985 A1* | 11/2008 | Van Dijk | 345/55 |

FOREIGN PATENT DOCUMENTS

| | | |
|---|---|---|
| JP | 2005062882 A | 3/2005 |
| JP | 2007-086791 A | 4/2007 |
| WO | 2007108436 A1 | 9/2007 |

* cited by examiner

LIQUID CRYSTAL DISPLAY APPARATUS

The present application claims priority from Japanese Patent Application No. JP 2008-083169, filed in the Japanese Patent Office on Mar. 27, 2008, the entire content of which is incorporated herein by reference.

BACKGROUND OF THE INVENTION

1. Field of the Invention

The present invention relates to a liquid crystal display apparatus in which each pixel is constructed by a plurality of sub-pixel structures.

2. Description of the Related Art

In recent years, as a display monitor of a liquid crystal television, a notebook-sized personal computer, a car navigation, or the like, for example, a liquid crystal display apparatus employing a VA (Vertical Alignment) mode using a vertical alignment liquid crystal is proposed. In the VA mode, a liquid crystal molecule has a nature of negative anisotropic permittivity, that is, the permittivity in the major-axis direction of the molecule is lower than that in the minor-axis direction, and a view angle wider than that in the TN (Twisted Nematic) mode is realized.

The liquid crystal display apparatus using the liquid crystal in the VA mode has, however, a problem such that luminance in the case where the display screen is seen from front and that in the case where the display screen is seen obliquely are different from each other. Concretely, the luminance characteristic in the case where the display screen is seen from front and that in the case where the display screen is seen, for example, in the direction of 45 degrees are largely different from each other (fluctuation to higher luminance). Such a phenomenon is called "wash out", i.e. upward luminance shift, "color shift", or the like and is the biggest drawback in a liquid crystal display apparatus in the case of using the liquid crystal in the VA mode.

As a measure for correcting the "foggy" phenomenon, a structure of dividing a unit pixel into two sub-pixels and making thresholds in the sub-pixels to be different from each other (multi-pixel structure) is proposed (for example, Japanese Unexamined Patent Application Publication No. 2007-86791.

Concretely, for example, in a multi-pixel structure (the structure of a pixel 120) illustrated in FIG. 14, two sub-pixels 120A and 120B are provided in the pixel 120. In the two sub-pixels 120A and 120B, liquid crystal elements 122A and 122B are formed, respectively. To the liquid crystal elements 122A and 122B, TFT (Thin Film Transistor) elements 121A and 121B are directly connected. To the TFT elements 121A and 121B, a common gate line G is connected, and data lines DA or DB are connected, respectively. With such a configuration, different drive voltages are applied to the sub-pixels 120A and 120B.

For example, in a multi-pixel structure (the structure of a pixel 120-1) illustrated in FIG. 15, the drive voltage is applied directly from a TFT element 121 to the sub-pixel 120A as one of the two sub-pixels 120A and 120B, and the drive voltage is applied from the TFT 121 to the other sub-pixel 120B via a connection line L101 and a capacitive element 123B. With such a configuration, different drive voltages are applied to the sub-pixels 120A and 120B.

SUMMARY OF THE INVENTION

In any of the cases illustrated in FIGS. 14 and 15, the different drive voltages are applied to the sub-pixels in the multi-pixel structure. Consequently, the view angle characteristic is improved to some extent. Although the view angle characteristic is improved to some extent, it is insufficient and there is room for improvement. In addition, since there is limitation in size of each of the sub-pixels and the rise characteristic of the liquid crystal in each of the sub-pixels, the response speed of the liquid crystal has not been sufficiently improved.

In FIG. 12 of Japanese Unexamined Patent Application Publication No. 2007-86791, a multi-pixel structure in which three sub-pixels and two TFT elements are provided for each pixel is proposed. Concretely, two sub-pixels are driven by one of the TFT elements, and the remaining one sub-pixel is driven by the other TFT element. However, since the same drive voltage is applied to the two sub-pixels driven by one of the TFT elements, the configuration is substantially similar to that of the case where two sub-pixels are provided for each pixel. Thus, the effect of improving the view angle characteristic is insufficient.

Such a problem is not peculiar to the liquid crystal in the VA mode described above, but it similarly occurs in any of liquid crystals in the other modes.

It is therefore desirable to provide a liquid crystal display apparatus realizing an improved view angle characteristic of luminance and higher response speed.

A liquid crystal display apparatus according an embodiment of the present invention includes: a plurality of pixels arranged in a matrix as a whole and each having a liquid crystal element, each of the pixels includes a first sub-pixel and a sub-pixel group having a plurality of second sub-pixels, in which a lower gray level voltage is applied to the first sub-pixel, and higher gray level voltages with different values is applied to the second sub-pixels, respectively; and driving means for driving the liquid crystal elements in the pixels by applying drive voltage based on a video signal. Area of the first sub-pixel is smaller than whole area of the sub-pixel group, and the driving means drives each of the pixels based on the video signal in a manner of space-divisional-driving which allows each of the first and the second sub-pixels to be driven separately.

In the liquid crystal display apparatus according to the embodiment of the present invention, at the time of the display-driving on the liquid crystal elements of each of the pixels, the space-divisional-driving which allows each of the first and the second sub-pixels to be driven separately is performed. By the space-divisional-driving, fluctuations (fluctuations when the display screen is seen from the front) in the gamma characteristic (the characteristic representing the relation between the gray level of the video signal and display luminance) in the case of seeing the display screen from an oblique direction are effectively dispersed. In addition, since the plurality of second sub-pixels are provided for the sub-pixel group, at least three sub-pixels are included in each of the pixels and are divided-driven independently of each other. As compared with the case where the halved-driving is performed in each of the pixels, the fluctuations in the gamma characteristic in the case of seeing the display screen from the oblique direction are dispersed more effectively. Further, since the area of the first sub-pixel is smaller than the whole area of the sub-pixel group, the drive voltage applied to the first sub-pixel at the time of the lower voltage gray level becomes high.

In the liquid crystal display apparatus according to the embodiment of the present invention, the plurality of second sub-pixels are provided for the sub-pixel group and, at the time of the display-driving on liquid crystal elements of each of the pixels, the space-divisional-driving which allows each of the first and the second sub-pixels to be driven separately is performed. Consequently, the fluctuations in the gamma characteristic in the case of seeing the display screen from the oblique direction are effectively dispersed, and the view angle characteristic of the luminance improves. In addition, the area of the first sub-pixel is set to be smaller than the whole area of the sub-pixel group. As a result, the drive voltage applied to the first sub-pixel at the time of the lower gray level becomes high, and response speed is improved. Therefore, while improving the view angle characteristic of luminance, the response speed is also improved.

Other and further objects, features and advantages of the invention will appear more fully from the following description.

DETAILED DESCRIPTION OF THE PREFERRED EMBODIMENTS

Embodiments of the present invention will be described in detail hereinbelow with reference to the drawings.

Figure 1:
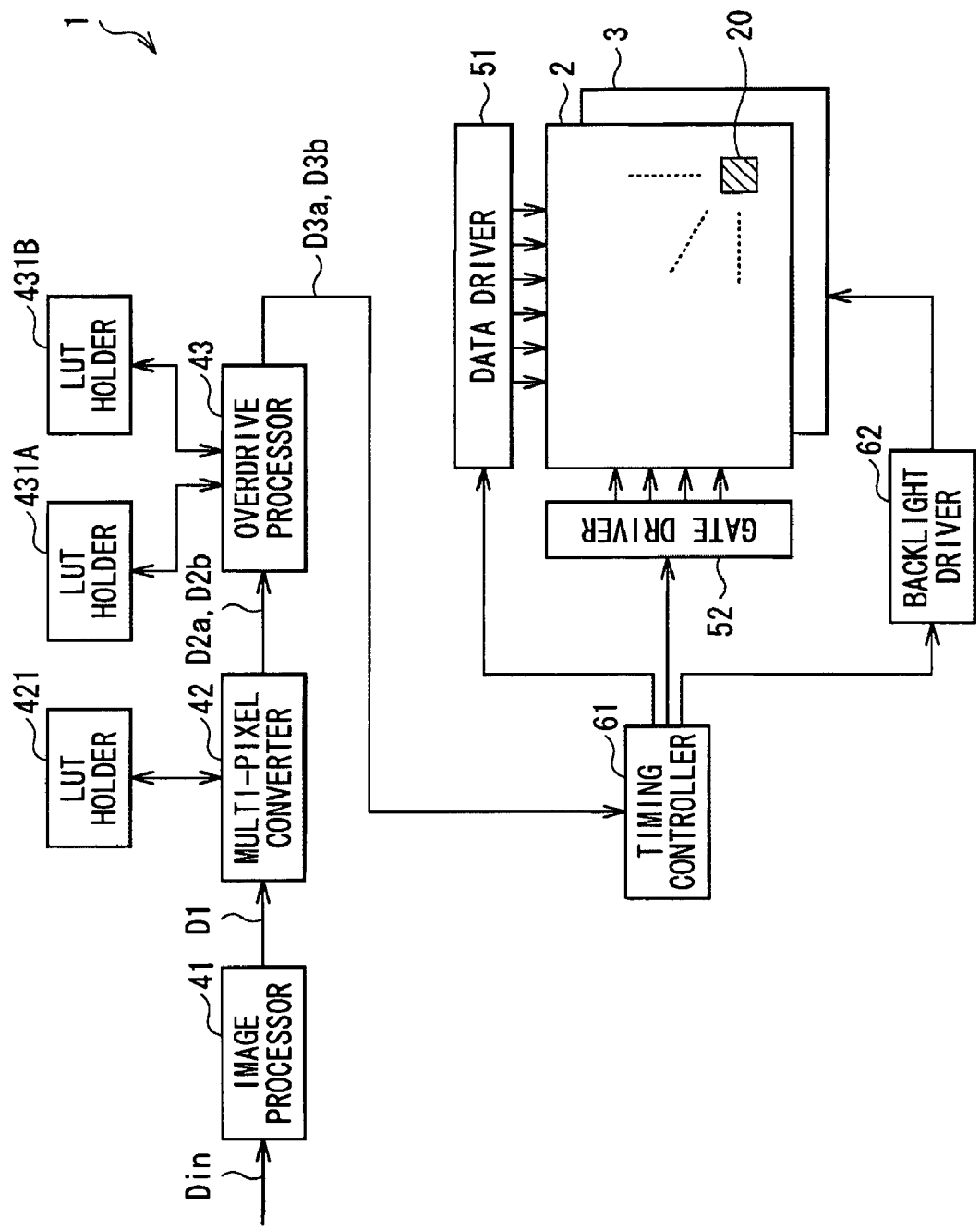
FIG. 1 is a block diagram illustrating the general configuration of a liquid crystal display apparatus according to an embodiment of the present invention.

FIG. 1 illustrates a general configuration of a liquid crystal display apparatus (liquid crystal display apparatus 1) according to an embodiment of the present invention. The liquid crystal display apparatus 1 has a liquid crystal display panel 2, a backlight 3, an image processor 41, a multi-pixel converter 42, an overdrive processor 43, three LUT (Look-Up Table) holders 421, 431A, and 431B, a data driver 51, a gate driver 52, a timing controller 61, and a backlight controller 63.

The backlight 3 is a light source for emitting light to the liquid crystal display panel 2 and includes, for example, a CCFL (Cold Cathode Fluorescent Lamp), an LED (Light Emitting Diode), and the like.

Figure 2:
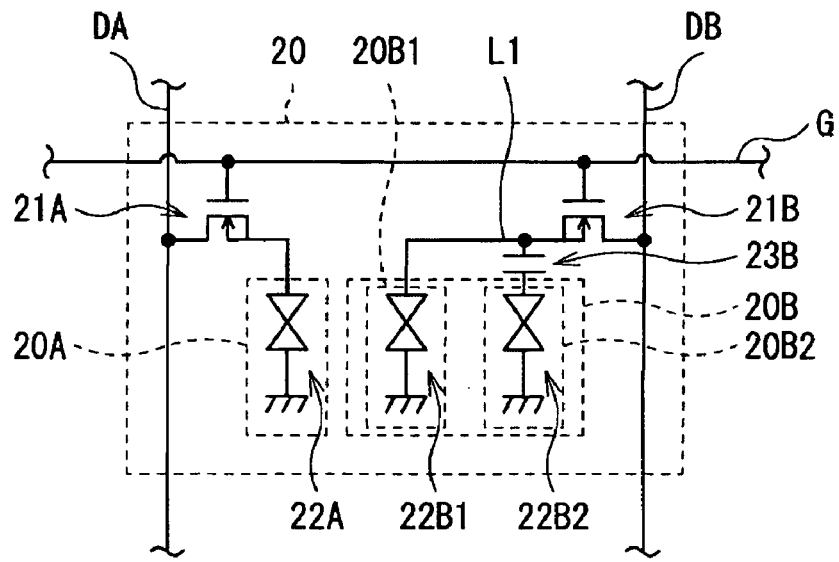
FIG. 2 is a circuit diagram illustrating a detailed configuration of a pixel illustrated in FIG. 1.
Figure 3:
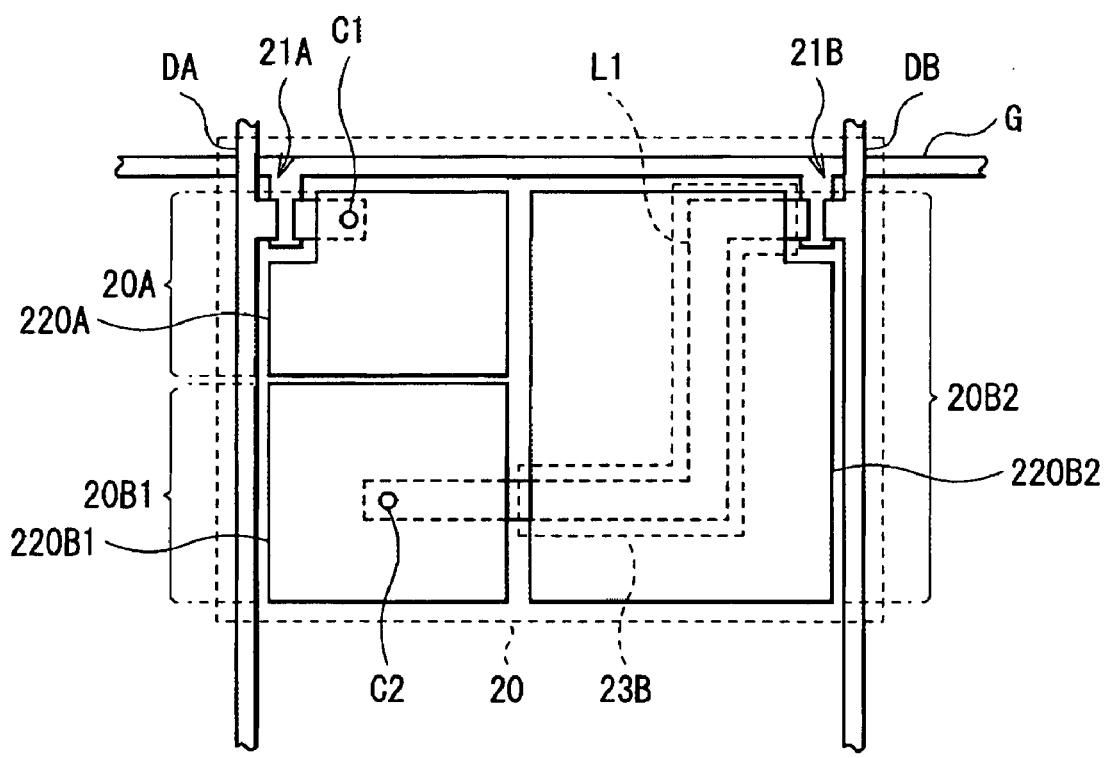
FIG. 3 is a plan view illustrating a detailed configuration of the pixel illustrating in FIG. 1.

The liquid crystal display panel 2 displays a video image based on a video signal Din by modulating light emitted from the backlight 3 on the basis of a drive voltage supplied from the data driver 51 in accordance with a drive signal supplied from the gate driver 52 which will be described later. The liquid crystal display panel 2 includes a plurality of pixels 20 disposed in a matrix as a whole. The pixels 20 are pixels corresponding to R (Red), G (Green), and B (Blue) (pixels provided with not-illustrated color filters for R, G, and B and emitting display light of R, G, and B colors). In each of the pixels 20, a pixel circuit including three sub-pixels (sub-pixels 20A, 20B1, and 20B2 which will be described later) made by one sub-pixel (the sub-pixel 20A which will be described later) and one sub-pixel group (a sub-pixel group 20B which will be described later). A detailed structure of the pixel circuit will be described later (FIGS. 2 and 3).

The image processor 41 generates a video signal D1 as an RGB signal by performing a predetermined image process on the video signal Din from the outside.

Figure 4:
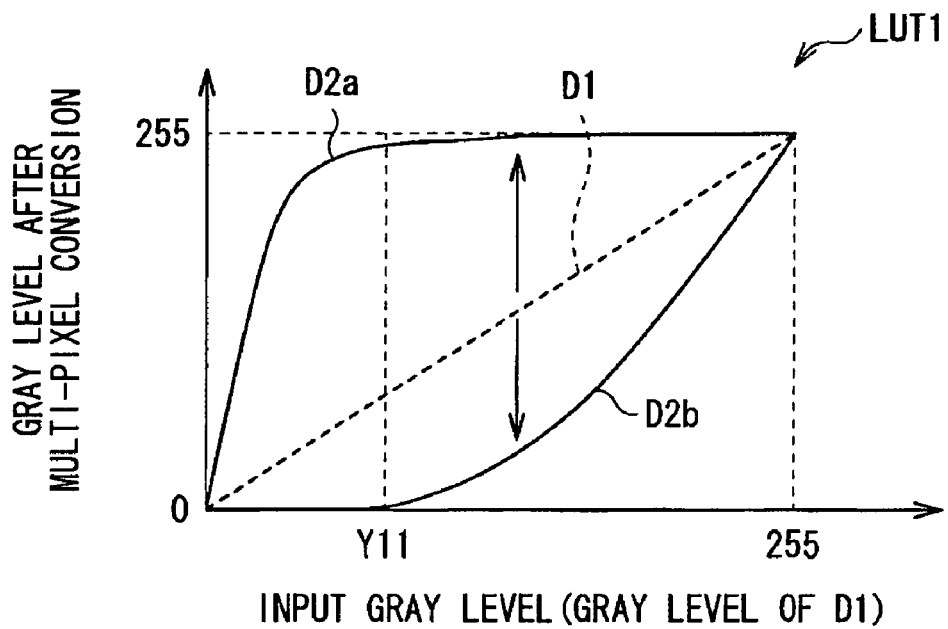
FIG. 4 is a characteristic diagram illustrating an example of an LUT (Look-Up Table) used in a multi-pixel converter illustrated in FIG. 1.
Figure 5:
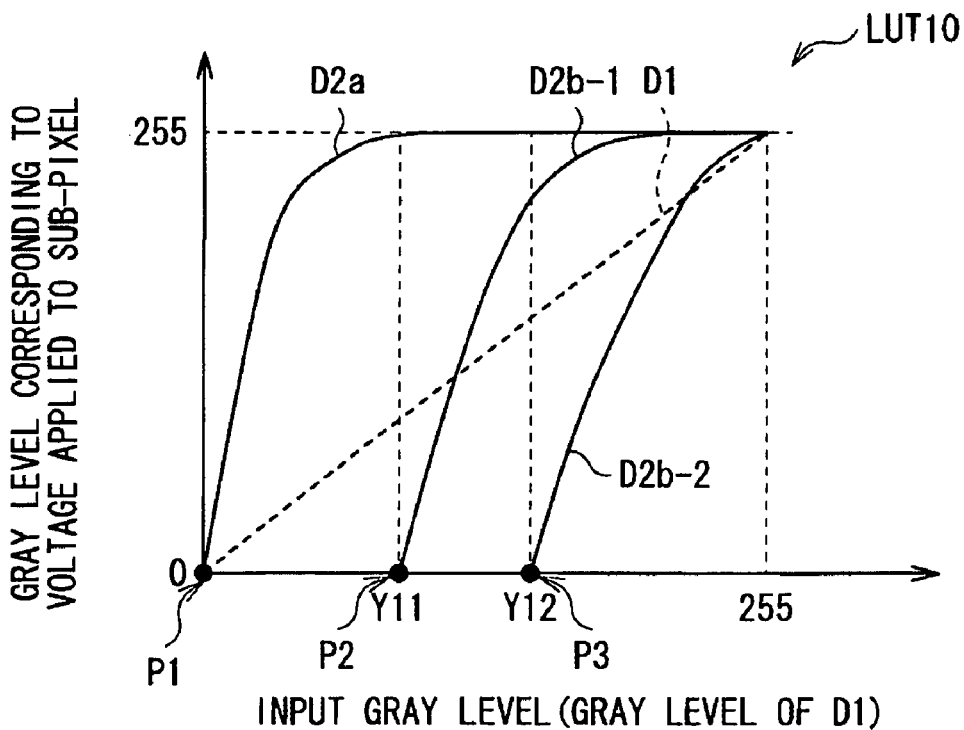
FIG. 5 is a characteristic diagram illustrating an example of an LUT converted from a drive voltage applied to sub-pixels on the basis of the LUT illustrated in FIG. 4.

The multi-pixel converter 42 converts the video signal D1 supplied from the image processor 41 to two video signals D2$a$ and D2$b$ for the one sub-pixel and the sub-pixel group (performs multi-pixel conversion), and supplies the video signals D2$a$ and D2$b$ to the overdrive converter 43. In the LUT, the luminance level (input gray level) of the video signal Di and the luminance level (gray level after the multi-pixel conversion) of the video signals D2$a$ and D2$b$ corresponding to the one sub-pixel and the one sub-pixel group are associated with each other for each of video signals of the pixels corresponding to R, G, and B. The details of the LUT held in the LUT holder 421 will be described later (FIGS. 4 and 5).

The overdrive processor 43 performs an overdrive process on each of the video signals D2$a$ and D2$b$ supplied from the multi-pixel converter 42 and supplies video signals D3$a$ and D3$b$ subjected to the overdrive process to a timing controller 61. At the time of such overdrive process, in the overdrive processor 43, overdrive amounts in the video signals D2$a$ and D2$b$ are made different from each other by using two LUTs: an LUT (an LUT 2A which will be described later) for the video signal D2$a$ held in the LUT holder 431A and an LUT (an LUT 2B which will be described later) for the video signal D2$b$ held in the LUT holder 431B. The details of the LUTs held in the LUT holders 431A and 431B will be described later (FIG. 6).

The gate driver 52 line-sequentially drives the pixels 20 in the liquid crystal display panel 2 along not-illustrated scan lines (gate lines G which will be described later) in accordance with timing control of the timing controller 61.

The data driver 51 supplies drive voltages based on the video signals D2$a$ and D2$b$ supplied from the timing controller 61 to the pixels 20 (more specifically, sub-pixels in the pixels 20) in the liquid crystal display panel 2. Concretely, the data driver 51 generates a video signal (the drive voltage) as an analog signal by performing D/A conversion on the video signals D3$a$ and D3$b$ by using a reference voltage supplied from a reference voltage generator (not illustrated), and outputs the video signal to the pixels 20.

The backlight driver 62 controls turn-on operation of the backlight 3. The timing controller 61 controls the drive timing of the gate driver 52 and the data driver 51 and supplies the video signals D3a and D3b to the data driver 51.

Referring now to FIGS. 2 and 3, the configuration of the pixel circuit formed in each of the pixels 20 will be described specifically. FIG. 2 illustrates an example of the circuit configuration of the pixel circuit in the pixel 20. FIG. 3 illustrates an example of the plane configuration of a pixel electrode in a liquid crystal element in the pixel circuit.

The pixel 20 is constructed by the sub-pixel 20A for use in expression of lower gray level (for example, voltage level about 0 to 2.3V) when threshold voltage is set to, for example, about 2.0V and the sub-pixel group 20B for use in expression of higher gray level (for example, voltage level about 2.3 to 7.0V) higher than the lower gray level. The sub-pixel group 20B is provided with two sub-pixels 20B1 and 20B2 different from each other used for expressing the higher gray level. That is, the pixel 20 is provided with the three sub-pixels 20A, 20B1, and 20B2 different from each other and has a multi-pixel structure. The lower gray level corresponds to a lower voltage in a normally black display mode, and corresponds to a higher voltage in a normally white display mode.

The sub-pixel 20A is provided with a liquid crystal element 22A. A TFT element 21A is directly connected to the sub-pixel 20A. Similarly, the sub-pixel 20B1 is provided with a liquid crystal element 22B1. A TFT element 21B is directly connected to the sub-pixel 20B1 via a line Ll. Similarly, the sub-pixel 20B2 is provided with a liquid crystal element 22B2. To the sub-pixel 20B2, the TFT element 21B is connected via the line Li and a capacitive element 23B.

To the pixel 20, a gate line G for line-sequentially selecting a liquid crystal element to be driven and two data lines DA and DB for supplying drive voltage (drive voltage supplied from the data driver 51) for the sub-pixel 20A and the sub-pixel group 20B, to a liquid crystal element to be driven are connected.

The liquid crystal element 22A functions as a display element for performing operation for display (emitting display light) in accordance with a drive voltage supplied from the data line DA to one end via the TFT element 21A. The liquid crystal element 22B1 also functions as a display element for performing operation for display (emitting display light) in accordance with a drive voltage supplied from the data line DB to one end via the TFT element 21B. On the other hand, the liquid crystal element 22B2 functions as a display element for performing operation for display (emitting display light) in accordance with a drive voltage supplied from the data line DB to one end via the TFT element 21B and the capacitive element 23B. Each of the liquid crystal elements 22A, 22B1, and 22B2 includes, for example, a liquid crystal layer (not illustrated) constructed by a liquid crystal in the VA mode and a pair of electrodes (not illustrated) sandwiching the liquid crystal layer. One side (one end) of the pair of electrodes is connected to the source of the TFT elements 21A and 21B or one end of the capacitive element 23B, and the other side (other end) is grounded.

The TFT element 21A is constructed by a MOS-FET (Metal Oxide Semiconductor-Field Effect Transistor). The gate is connected to the gate line G, the source is connected to one end of the liquid crystal element 22A (electrically connected by, for example, a contact C1 in FIG. 3), and the drain is connected to the data line DA. The TFT element 21A functions as a switching element for supplying a drive voltage for the sub-pixel 20A (the drive voltage based on the video signal D2a) to one end of the liquid crystal element 22A. Concretely, according to a selection signal supplied from the gate driver 52 via the gate line G, the data line DA and one end of the liquid crystal element 22A are selectively made conductive.

The TFT element 21B is also similarly constructed by a MOS-FET. The gate is connected to the gate line G, the source is connected to one end of the liquid crystal element 22B and the other end of the capacitive element 23B, and the drain is connected to the data line DB. The TFT element 21B functions as a switching element for supplying a drive voltage for the sub-pixels 20B1 and 20B2 (the drive voltage based on the video signal D2b) to one end of the liquid crystal element 22B and the other end of the capacitive element 23B. Concretely, according to a selection signal supplied from the gate driver 52 via the gate line G, the data line DB and one end of the liquid crystal element 22B and the other end of the capacitive element 23B are selectively made conductive.

The capacitive element 23B is disposed between the source of the TFT element 21B and one end of the liquid crystal element 22B2. The capacitive element 23B supplies the drive voltage to the sub-pixel 20B2 in cooperation with the TFT element 21B. Consequently, as will be described later specifically, different drive voltages are applied to the sub-pixels 20B1 and 20B2 in the sub-pixel group 20B. For example, as illustrated in FIG. 3, the capacitive element 23B is formed in an interlayer between a sub-pixel electrode 220B2 and the line Li and is electrically connected to a sub-pixel electrode 220B1 by a contact C2.

For example, like the sub-pixel electrodes 220A, 220B1, and 220B2 illustrated in FIG. 3, an electrode as one side of each of the pair of electrodes in the liquid crystal elements 22A, 22B1, and 22B2 has a flat shape. In the embodiment, the area (=Sa) of the sub-pixel 20A is set to be smaller than the area of the sub-pixel group 20B (=Sb: area Sb1 of the sub-pixel 20B1+area Sb2 of the sub-pixel 20B2). With the configuration, as the details will be described later, the response speed of the liquid crystal in the lower gray level improves.

From the viewpoint of response speed, preferably, the area Sa of the sub-pixel 20A is smaller than the entire area (=Stotal) of the pixel 20 as much as possible. It is preferable that, for example, the area Sa of the sub-pixel 20A is set to be equal to or less than ⅓ of the entire area Stotal of the pixel 20 for the reason that improvement in response in the lower gray level is particularly conspicuous. More preferably, the area Sa of the sub-pixel 20A, the area Sb1 of the sub-pixel 20B1, and the area Sb2 of the sub-pixel 20B2 satisfy the following equation (11) for the reason that improvement in response at the lower gray level becomes more conspicuous.

$$Sa<Sb1<Sb2 \qquad (11)$$

With reference to FIGS. 4 and 5, the details of the LUT (LUT1) used in the multi-pixel converter 42 will be described. In characteristic diagrams described below, as an example, it is assumed that the luminance level of the video signal is set to a gray level from 0/255 level (black display state) to 255/255 level (white display state).

For example, as illustrated in FIG. 4, LUT1 is used for dividing the luminance level of the video signal Dl supplied to the multi-pixel converter 42 into the luminance level of the video signal D2a for the sub-pixel 20A and the luminance level of the video signal D2b for the sub-pixel 20B (for the sub-pixels 20B1 and 20B2). That is, the display-driving for the pixels 20 is halved in space for the sub-pixel 20A and the sub-pixel group 20B to perform divided-driving or space-divisional-driving.

In LUT1, as the input gray level increases, the gray level corresponding to the sub-pixel 20A rises for the first time. After the gray level corresponding to the sub-pixel 20A reaches almost the highest level as illustrated by gray level Y11 in FIG. 4, the gray level corresponding to the sub-pixel group 20B rises. In such a manner, the drive voltage is applied to the sub-pixel 20A and the sub-pixel group 20B in order.

In the sub-pixel group 20B, as described above, the drive voltage (drive voltage based on the video signal D2*b*) is directly supplied from the TFT element 21B in the sub-pixel 20B1. On the other hand, the drive voltage (drive voltage based on the video signal D2*b*) is supplied from the TFT element 21B via the capacitive element 23B in the sub-pixel 20B2. Therefore, when LUT is converted from the drive voltages applied to the sub-pixels 20A, 20B1, and 20B2 on the basis of the LUT1 illustrated in FIG. 4, for example, LUT10 illustrated in FIG. 5 is obtained. Concretely, drive voltages corresponding to virtual video signals D2*b*-1 and D2*b*-2 in the diagram are applied to the sub-pixels 20B1 and 20B2 on the basis of the video signal D2*b*. As a result, different drive voltages are applied to the sub-pixels 20B1 and 20B2. Therefore, in the LUT10, as the input gray level increases, the gray level corresponding to the sub-pixel 20A rises first. After the gray level corresponding to the sub-pixel 20A reaches almost the highest level as illustrated by level Y11 in FIG. 5, the gray level corresponding to the sub-pixel 20B1 rises. Further, after the gray level corresponding to the sub-pixel 20B1 reaches almost the high gray level as illustrated by level Y12 in FIG. 5, the gray level corresponding to the sub-pixel 20B2 rises. In such a manner, the drive voltage is applied to the sub-pixel 20A, the sub-pixel 20B1, and the sub-pixel 20B2 in order.

Figure 6A:
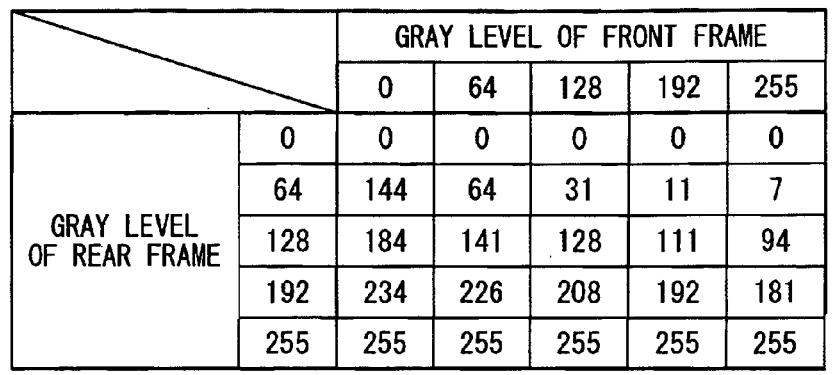
FIGS. 6A and 6B are characteristic diagrams each illustrating an example of an LUT used in an overdrive processor illustrated in FIG. 1.
Figure 6B:
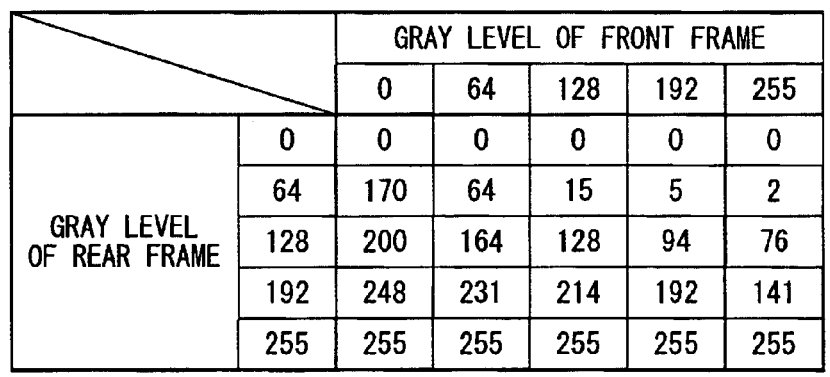

Referring now to FIGS. 6A and 6B, two LUTs (LUT2A and LUT2B) used in the overdrive processor 43 will be described specifically.

For example, as illustrated in FIG. 6A, on the basis of the gray level of the video signal D2*a* in a front frame (start frame) in the overdrive process and the gray level of the video signal D2*a* in a rear frame (target frame) in the overdrive process, LUT2A is used to determine a video signal D3*a* in the rear frame after the overdrive process. Concretely, at the time of a response from low gray level to high gray level, a video signal corresponding to a higher gray level is input. Similarly, for example, as illustrated in FIG. 6B, on the basis of the gray level of the video signal D2*b* in a front frame (start frame) in the overdrive process and the gray level of the video signal D2*b* in a rear frame (target frame) in the overdrive process, LUT2B is used to determine a video signal D3*b* in the rear frame after the overdrive process.

In the embodiment, LUTs 2A and 2B are set so that the overdrive amounts in the overdrive processes (the gray levels of the video signals D3*a* and D3*b* in the rear frame after the overdrive process in FIG. 6) are different from each other between the sub-pixel 20A and the sub-pixel group 20B (sub-pixels 20B1 and 20B2). That is, the overdrive amount for improving the response speed of the liquid crystal in the sub-pixel 20A and that in the sub-pixel group 20B (the sub-pixels 20B1 and 20B2) are set independently of each other. As the details will be described later, the difference between the characteristic of the sub-pixel (the sub-pixel 20A) to which only the TFT element is directly connected and the characteristic of the sub-pixels (the sub-pixels 20B1 and 20B2) connected so as to include the capacitive element 23B is absorbed, and the optimum response is realized. Concretely, although the use of LUT2B has meaning when the sub-pixel group 20B is active, at this time, the sub-pixel 20A is already active and some display light is emitted. Consequently, in the sub-pixel 20B, even when the transmission light amount fluctuates, it overlaps the transmission light amount of the sub-pixel 20A, and the fluctuation amount in the entire pixel 20 is relatively small. Accordingly, as the gray level displayed in the sub-pixel group 20B, an overdrive amount more extreme as compared with that of the LUT2A is set. Specifically, in the LUT2B illustrated in FIG. 6B, when the gray level becomes higher than that in the LUT2A illustrated in FIG. 6A, higher gray level is set. When the gray level becomes lower, lower gray level is set. For example, in the case where the gray level changes from 64th shade of gray to 192nd shade of gray, 226th shade of gray is allocated in the LUT2A. On the other hand, 231st shade of gray is allocated in the LUT2B.

The multi-pixel converter 41, the overdrive processor 43, the timing controller 61, the data driver 51, and the gate driver 52 correspond to one of examples of "driving means" in the present invention. The sub-pixel 20A corresponds to one of examples of a "first sub-pixel" in the present invention. The sub-pixel group 20B corresponds to one of examples of a "sub-pixel group" in the present invention, and the sub-pixels 20B1 and 20B2 correspond to one of examples of a "second sub-pixel" in the present invention. The TFT elements 21A and 21B correspond to one of examples of "two switching elements" in the present invention, and the capacitive element 23B corresponds to one of examples of a "capacitive element" in the present invention. LUT1 illustrated in FIG. 4 corresponds to one of examples of a "first LUT" in the present invention.

The operation of the liquid crystal display apparatus 1 of the embodiment will now be described in detail.

First, the basic operation of the liquid crystal display apparatus 1 will be described with reference to FIGS. 1 to 4.

In the liquid crystal display apparatus 1, as illustrated in FIG. 1, the video signal Din supplied from the outside is subject to the image process of the image processor 41, thereby generating the video signal D1 for each of the pixels 20. The video signal D1 is supplied to the multi-pixel converter 42. The multi-pixel converter 42 converts the supplied video signal Dl to the two video signals D2*a* and D2*b* for the sub-pixel 20A and the sub-pixel group 20B by using the LUT1 illustrated in FIG. 4 (multi-pixel conversion). The two video signals D2*a* and D2*b* are subject to the overdrive process in the overdrive processor 43 to become the two video signals D3*a* and D3*b*. The two video signals D3*a* and D3*b* are supplied to the data driver 51 via the timing controller 61. The data driver 51 performs D/A conversion on the video signals D3*a* and D3*b*, thereby generating two video signals as analog signals. On the basis of the two video signals, by drive voltage to the sub-pixel 20A and the sub-pixel group 20B in each of the pixels 20 output from the gate driver 52 and the data driver 51, the line-sequential display driving operation is performed on each of the pixels 20. Concretely, as illustrated in FIGS. 2 and 3, the TFT elements 21A and 21B turn on or off according to the selection signal supplied from the gate driver 52 via the gate line G to make the data lines DA and DB and the liquid crystal elements 22A and 22B1 and the capacitive element 23B selectively conductive. The drive voltage based on the two video signals supplied from the data driver 51 is supplied to the liquid crystal elements 22A, 22B1, and 22B2 to perform display drive operation.

In the pixel 20 in which the data lines DA and DB and the liquid crystal elements 22A and 22B and the capacitive element 23B are conductive, illumination light from the backlight 30 is modulated in the liquid crystal display panel 2, and the modulated light is output as display light. In such a manner, the video image display based on the video signal Din is performed in the liquid crystal display apparatus 1.

Next, referring to FIGS. 5 and 7 in addition to FIGS. 1 to 4, the liquid crystal display apparatus according to the embodiment of the present invention will be described specifically.

Figure 7:
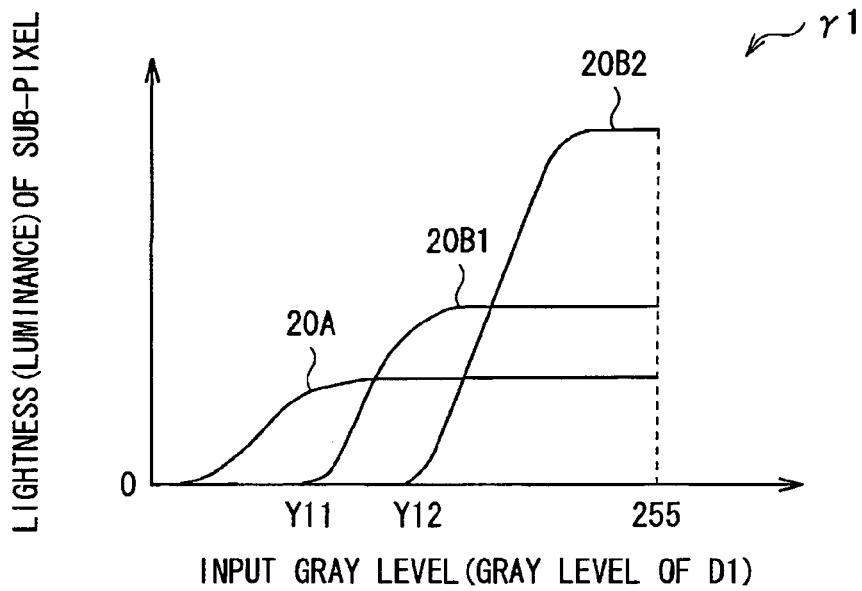
FIG. 7 is a characteristic diagram illustrating an example of the relation between tone of a video signal and lightness (luminance) of each of the sub-pixels.

FIG. 7 illustrates an example (gamma characteristic γ1) of the relation between the gray level (input gray level) of the video signal Di and the lightness (luminance) of the sub-pixels 20A, 20B1, and 20B2.

In the liquid crystal display apparatus 1 of the embodiment, by using the LUT1 illustrated in FIG. 4, at the time of performing display drive for the liquid crystal elements 22A, 22B1, and 22B2 of the pixels 20, the display driving for the pixels 20 is halved in space to perform divided driving or the space-divisional-driving. Concretely, based on the video signals D2a and D2b obtained by performing the multi-pixel conversion on the video signal D1, the display driving for the pixels 20 is halved in space in each of the sub-pixel 20A and the sub-pixel group 20B to perform the space-divisional-driving. Therefore, as compared with the case where such space-divisional-driving is not performed, fluctuations (fluctuations in the case where the display screen is seen from the front direction) in the gamma characteristic (the characteristic representing the relation between the luminance level of the video signal D1 and the lightness (luminance)) in the case where the display screen is seen from an oblique direction (for example, a 45° direction) is dispersed. Thereby, the view angle characteristic of luminance improves more than the case where the space-divisional-driving by the multi-pixel structure is not performed.

In the embodiment, the sub-pixel group 20B in each of the pixels 20 is provided with the two sub-pixels 20B1 and 20B2 different from each other. Consequently, for example, as illustrated in FIGS. 4 and 5, the drive voltages corresponding to the virtual video signals D2b-1 and D2b-2 in the drawing are applied to the sub-pixels 20B1 and 20B2 on the basis of the video signal D2b, so that the different drive voltages are applied to the sub-pixels 20B1 and 20B2. Therefore, as the input gray level increases, the gray level corresponding to the sub-pixel 20A rises first in a position P1. After the gray level corresponding to the sub-pixel 20A reaches almost the high level as illustrated by the gray level Y11 in FIG. 5, the gray level corresponding to the sub-pixel 20B1 rises in a position P2. Further, after the gray level corresponding to the sub-pixel 20B1 reaches almost the high level as illustrated by the gray level Y12 in FIG. 5, the gray level corresponding to the sub-pixel 20B2 rises in a position P3. In such a manner, the drive voltage is applied to the sub-pixel 20A, the sub-pixel 20B1, and the sub-pixel 20B2 in order. As a result, for example, like the gamma characteristic γ1 illustrated in FIG. 7, the three sub-pixels 20A, 20B1, and 20B2 in each of the pixels 20 are divided-driven independently of each other. Therefore, the fluctuations in the gamma characteristic in the case where the display screen is seen obliquely are dispersed more efficiently (dispersed in three stages in this case) than the case of the related art where the halved driving in each pixel is performed.

Further, in the embodiment, the area Sa of the sub-pixel 20A is set to be smaller than the area Sb of the sub-pixel group 20B, so that the response speed of the liquid crystal in the lower gray level improves as compared with that in the related art for the following reason. First, generally, the response of the liquid crystal is slow in the case where low voltage is applied. For example, in the liquid crystal in the VA mode, the response at transition from the black display state to the gray display state is slow. When the response from the black display state is considered, the response at the transition from the black display state to a light gray display state is faster than that at the transition from the black display state to a dark gray display state. Using the phenomenon, in the embodiment, for example, when the area Sa of the sub-pixel 20A is set to ¼ of the entire area Stotal of the pixel 20, at the time of displaying luminance of ¼ of the white display state, the same drive voltage as that in the white display state is applied to the sub-pixel 20A. That is, the drive voltage applied to the sub-pixel 20A at the time of the lower gray level is higher than that in the related art. For example, even response in the case of the transition from the black display state to luminance of 1/44 of the white display state, response speed which is similar to that at the transition from the black display state to the white display state is realized.

In the embodiment as described above, the sub-pixel group 20B is provided with the plural sub-pixels 20B1 and 20B2 and, at the time of display driving on the liquid crystal elements of each of the pixels 20, the space-divisional-driving which allows each of the sub-pixels 20A, 20B1, and 20B2 to be driven separately is performed. Consequently, fluctuations in the gamma characteristic in the case of viewing the display screen from the oblique direction are dispersed effectively, and the view angle characteristic of luminance is improved as compared with that in the related art. In addition, since the area Sa of the sub-pixel 20A is set to be smaller than the whole area Sb of the sub-pixel group 20B, the drive voltage applied to the sub-pixel 20A at the time of lower gray level becomes higher than that in the related art, and the response speed is improved. Therefore, while improving the view angle characteristic of luminance, the response speed at all of gray levels is improved.

Although the present invention has been described by the embodiment above, the invention is not limited to the embodiment and various modifications are possible.

Figure 8:
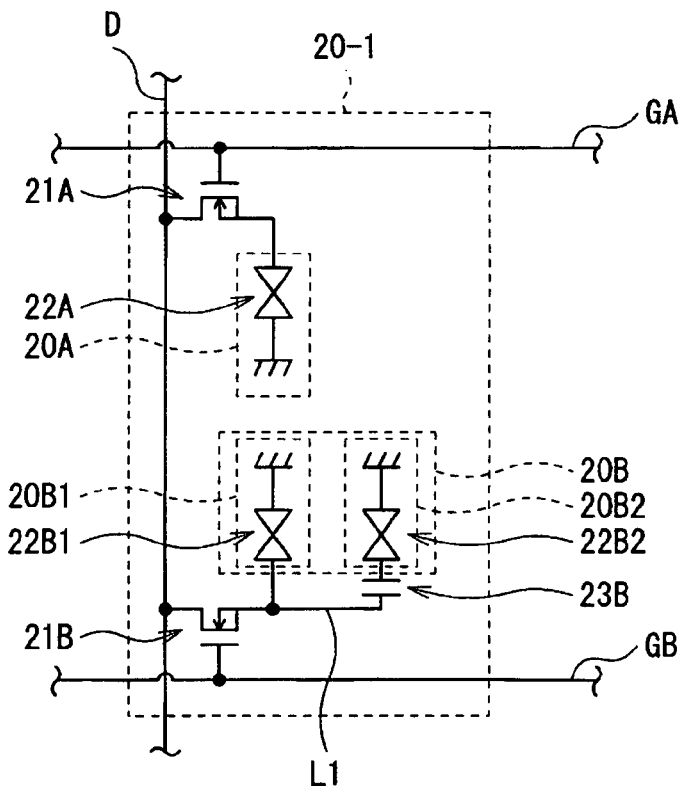
FIG. 8 is a circuit diagram illustrating a detailed configuration of a pixel according to a first modification of the present invention.

For example, in the foregoing embodiment, the multi-pixel structure in the case where the one gate line G and the two data lines DA and DB are connected in each pixel like the pixel 20 illustrated in FIGS. 2 and 3 has been described. The present invention is also applicable to a multi-pixel structure in which two gate lines GA and GB and one data line D are connected in each pixel like a pixel 20-1 (first modification) illustrated in FIGS. 8 and 9. In the case of the pixel 20-1, two sub-pixel line selection periods obtained by halving one pixel line selection period along the time base are provided, and the sub-pixels 20A, 20B-1, and 20B-2 are driven according to the selection signal supplied from the gate lines GA and GB and the drive voltage supplied from the data driver D in each of the sub-pixel line selection periods.

Figure 10:
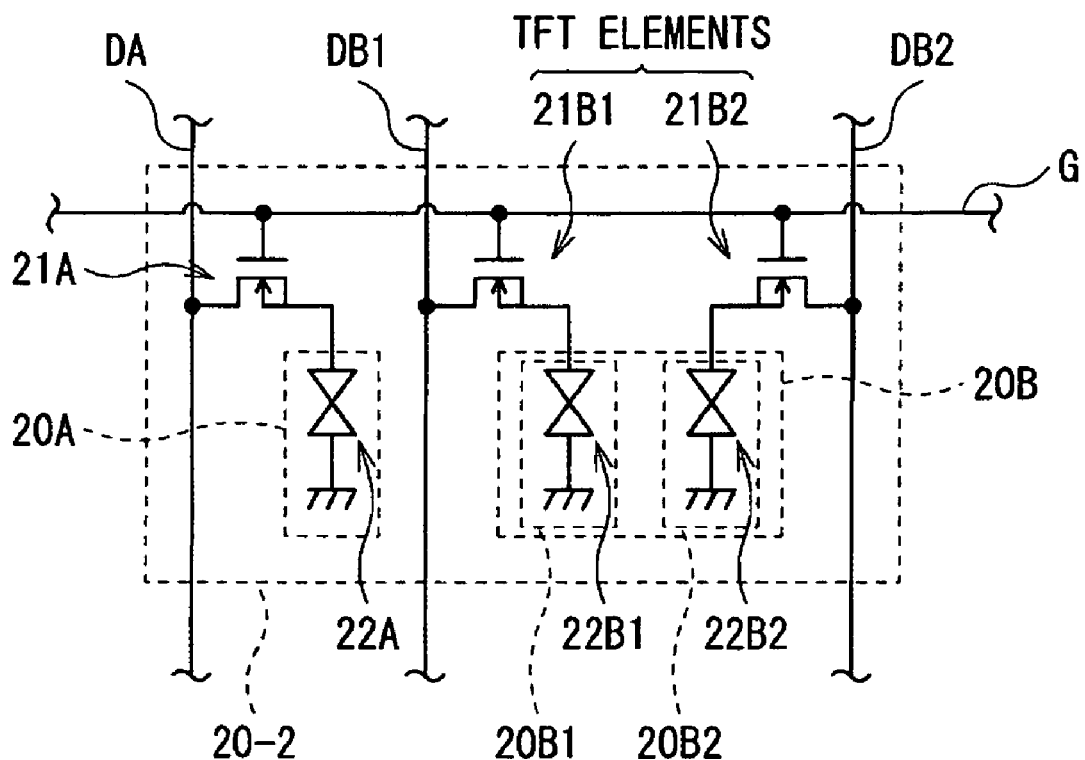
FIG. 10 is a circuit diagram illustrating a detailed configuration of a pixel according to a second modification of the invention.
Figure 11:
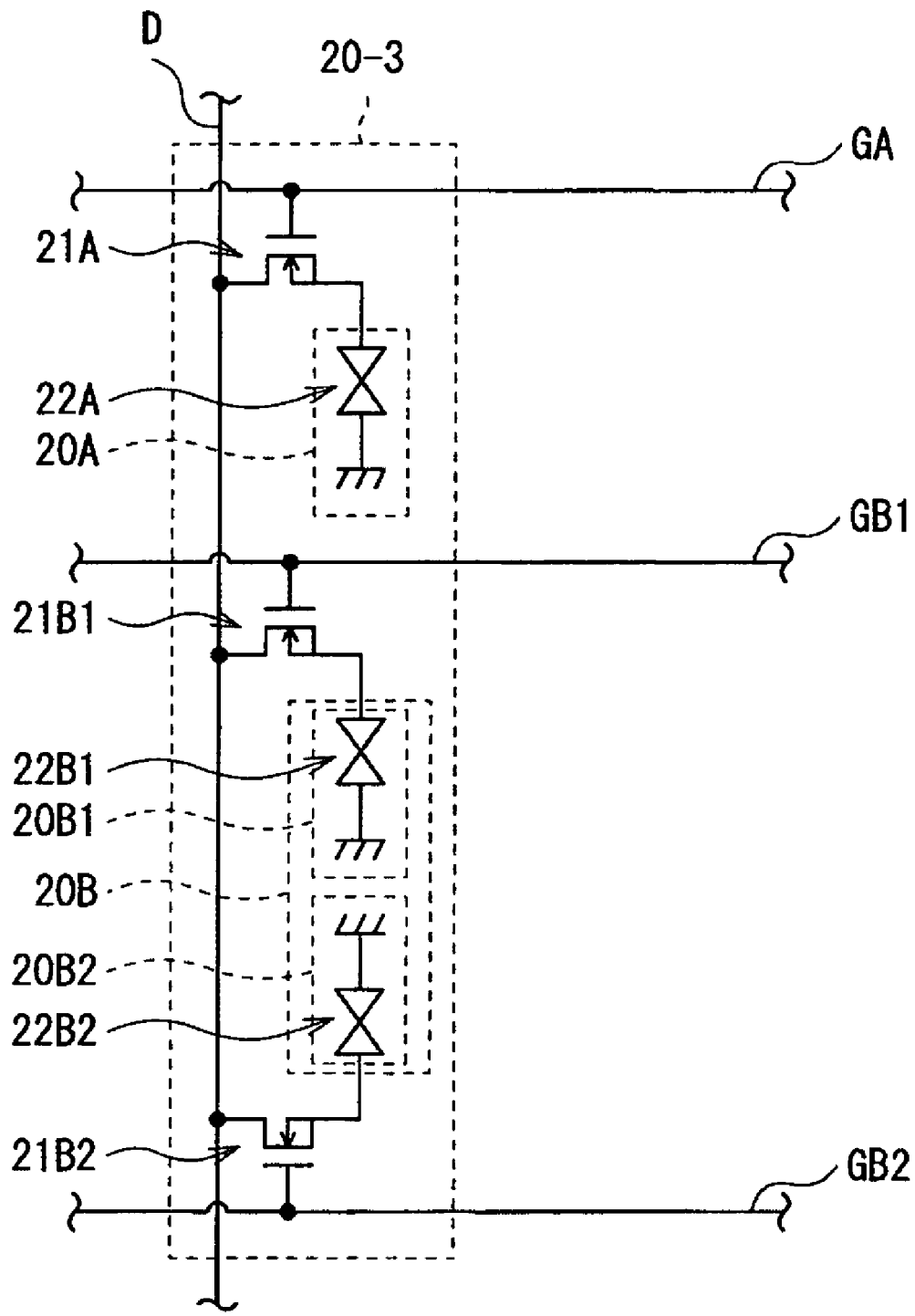
FIG. 11 is a circuit diagram illustrating a detailed configuration of a pixel according to a third modification of the invention.

In the foregoing embodiment, the case where one switching element 21B and one capacitive element 23B are connected to the sub-pixels 20B1 and 20B2 in the sub-pixel 20B has been described. For example, like a pixel 20-2 (second modification) illustrated in FIG. 10 and a pixel 20-3 (third modification) illustrated in FIG. 11, two switching elements 21B1 and 21B2 may be connected to the sub-pixels 20B1 and 20B2 in the sub-pixel group 20B. Specifically, each pixel 20-2 may include the three TFT elements 21A, 21B1, and 21B2 for supplying the drive voltage to the sub-pixels 20A, 20B1, and 20B2. By using an LUT (not illustrated: second LUT) in which the luminance level in the video signal and that in the video signal corresponding to the sub-pixels 20A, 20B1, and 20B2 are associated with each other, the space-divisional-driving for the sub-pixels 20A, 20B1, and 20B2 may be performed.

Figure 12:
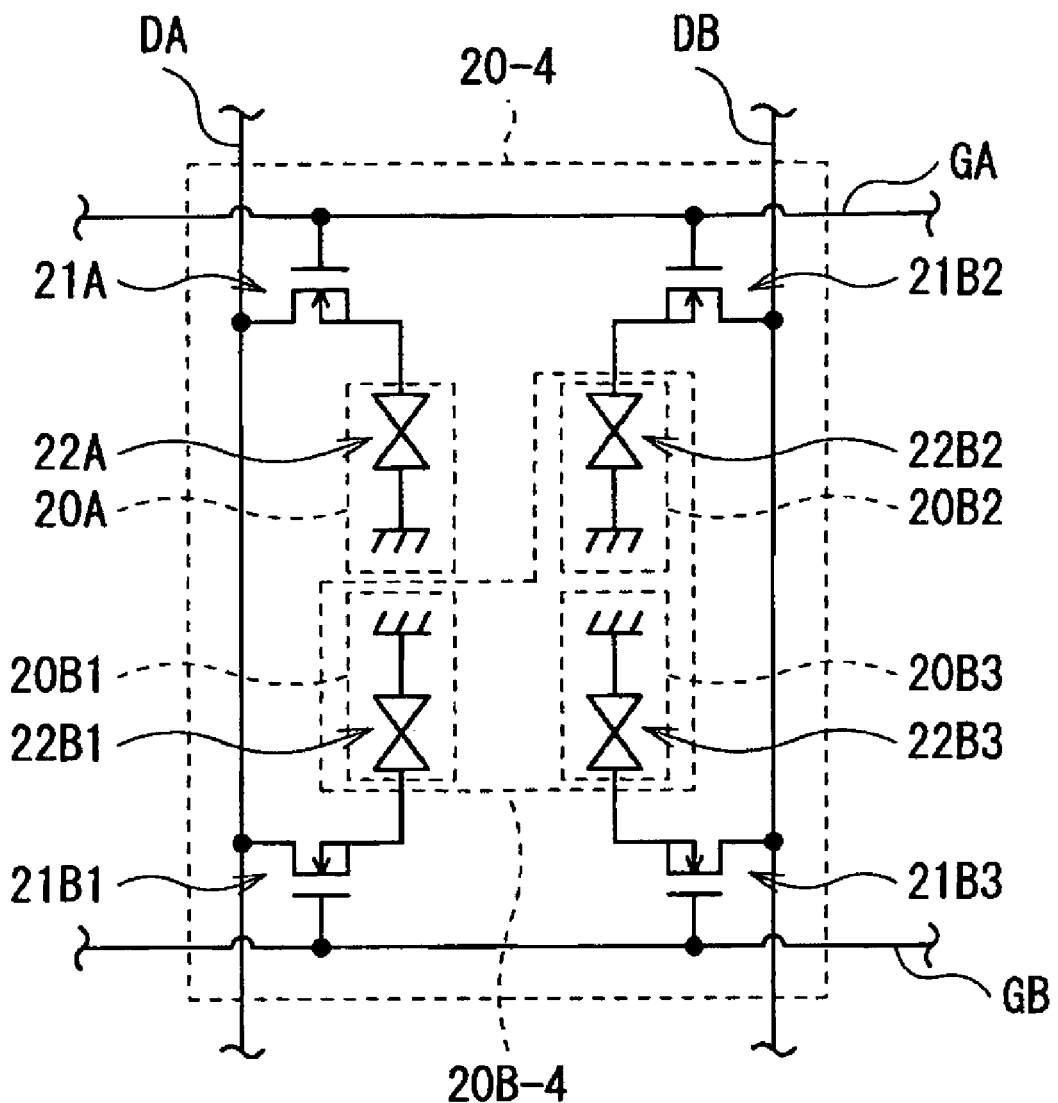
FIG. 12 is a circuit diagram illustrating a detailed configuration of a pixel according to a fourth modification of the invention.
Figure 13:
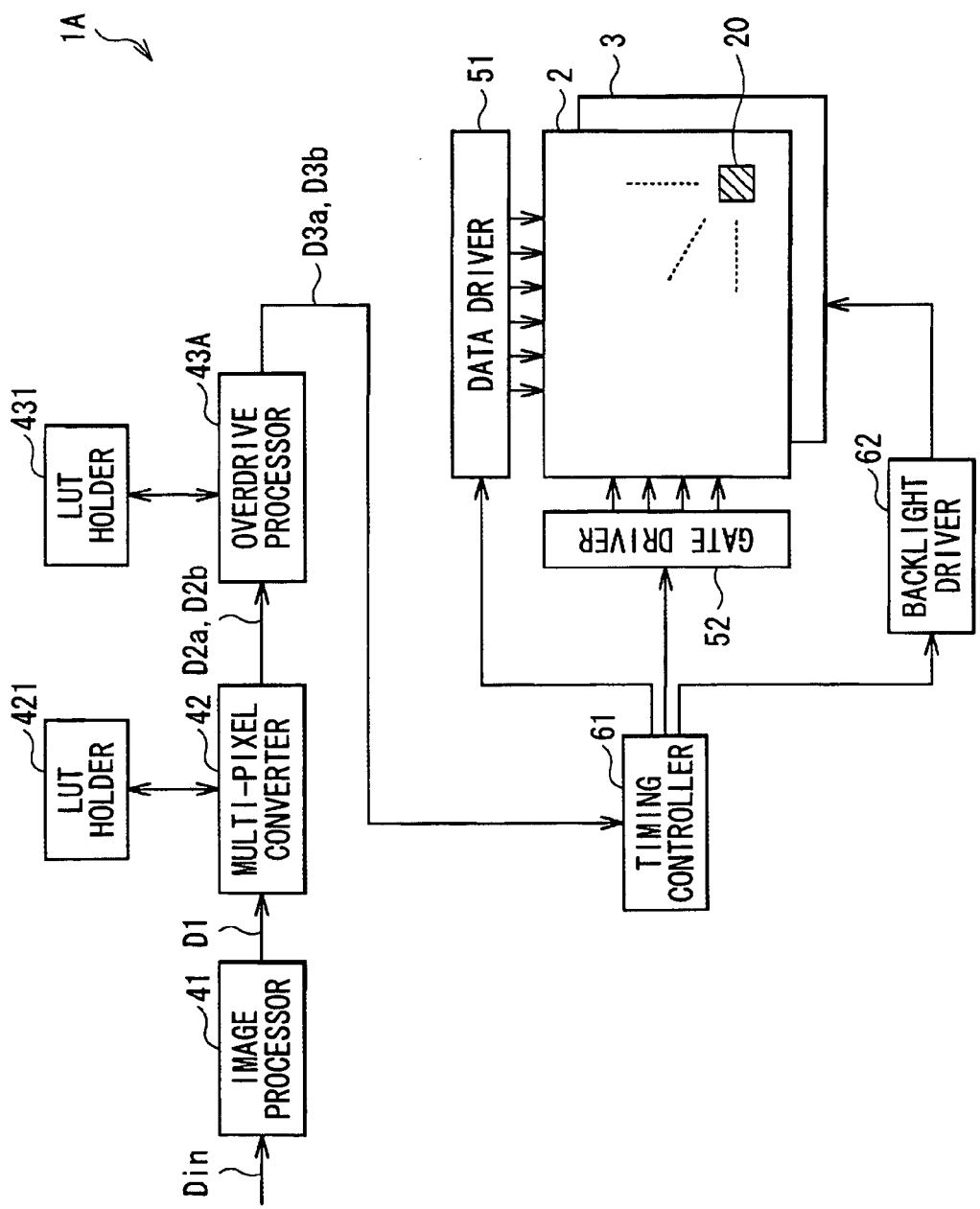
FIG. 13 is a block diagram illustrating a general configuration of a liquid crystal display apparatus according to a fifth modification of the invention.
Figure 14:
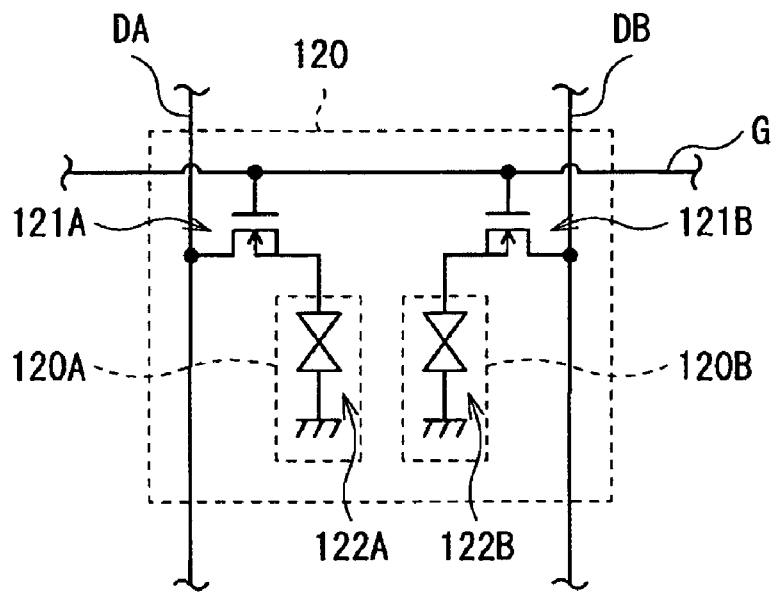
FIG. 14 is a circuit diagram for explaining an example of a multi-pixel structure in a liquid crystal display apparatus according to a related art.
Figure 15:
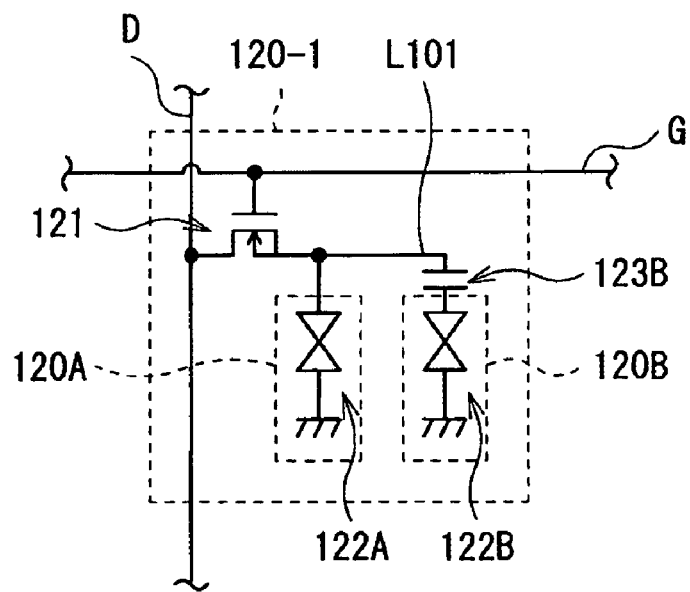
FIG. 15 is a circuit diagram for explaining another example of the multi-pixel structure in the liquid crystal display apparatus according to the related art.

In the foregoing embodiment, the case where three sub-pixels 20A, 20B1, and 20B2 are provided in each of the pixels 20 by providing two sub-pixels 20B1 and 20B2 in the sub-pixel group 20B has been described. The number of sub-pixels included in the sub-pixel group and the number of sub-pixels included in the pixels are not limited to the above numbers but may be arbitrarily set. For example, like a pixel 20-4 (fourth modification) illustrated in FIG. 12, a multi-pixel structure may be employed such that the two gate lines GA and GB and the two data lines DA and DB are connected in each pixel, and three sub-pixels 20B1, 20B2, and 20B3 are provided in the sub-pixel group 20B-4, thereby providing four sub-pixels 20A, 20B1, 20B2, and 20B3 in each pixel 20-4. In this case as well, the number of gate lines and the number of data lines are not limited to those of the example. The number of TFT elements (the number of capacitive element 23B) is also not limited to that in this case.

Figure 9:
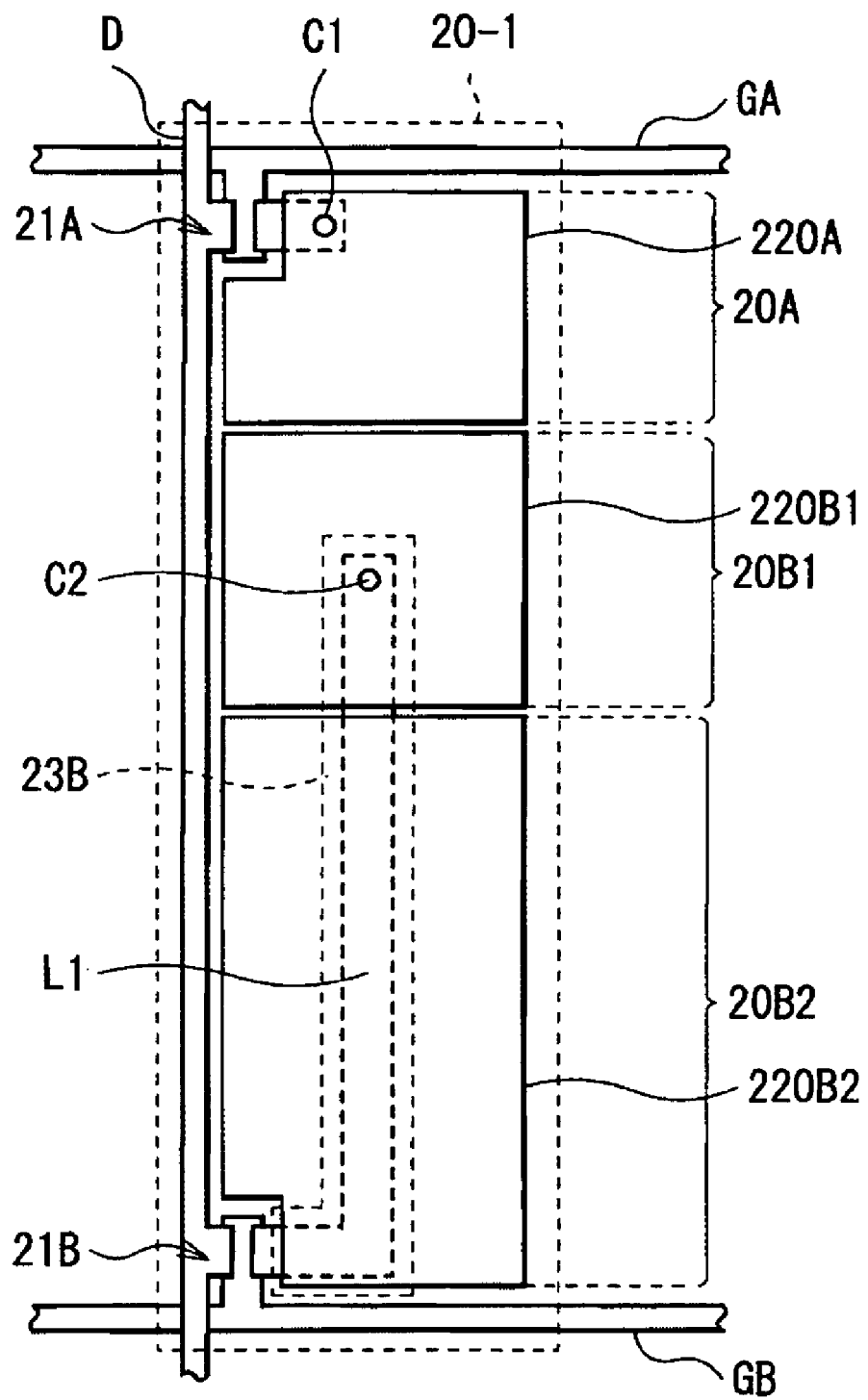
FIG. 9 is a plan view illustrating a detailed configuration of the pixel according to the first modification of the invention.

Although the plane shape of the sub-pixel element has been concretely described in the foregoing embodiment, the plane shape of the sub-pixel electrode is not limited to those illustrated in FIGS. 3 and 9.

Further, in the foregoing embodiment, the liquid crystal in the VA mode has been described. The present invention is applicable to liquid crystals in other modes such as the TN (Twisted Nematic) mode and the IPS (In-Plane Switching) mode). From the viewpoint of improving the response speed of the liquid crystal, preferably, the invention is applied to the liquid crystals in the VA mode and the TN mode.

Obviously many modifications and variations of the present invention are possible in the light of the above teachings. It is therefore to be understood that within the scope of the appended claims the invention may be practiced otherwise than as specifically described.

What is claimed is:

1. A liquid crystal display apparatus comprising:
a plurality of pixels arranged in a matrix as a whole and each having a liquid crystal element, each of the pixels including a first sub-pixel and a sub-pixel group having a plurality of second sub-pixels, a lower gray level voltage being applied to the first sub-pixel, and higher gray level voltages with different values being applied to the second sub-pixels, respectively; and
driving means for driving the liquid crystal elements in the pixels by applying drive voltage based on a video signal,
wherein
area of the first sub-pixel is smaller than whole area of the sub-pixel group,
the driving means drives each of the pixels based on the video signal in a manner of space-divisional-driving which allows each of the first and the second sub-pixels to be driven separately,
the sub-pixel group includes two sub-pixels so that each of the pixels has three respective sub-pixels which include a respective first sub-pixel and respective two second sub-pixels such that the three respective sub-pixels for each pixel are separate or distinct from the sub-pixels of other pixels, and
the driving means drives each second sub-pixel of the respective two second sub-pixels with a different drive voltage.

2. The liquid crystal display apparatus according to claim 1, wherein the driving means:
applies a first input-versus-output luminance characteristic, in which output luminance rises from a first input luminance position, to the first sub-pixel;
applies a second input-versus-output luminance characteristic, in which output luminance rises from a second input luminance position which is higher in position than the first input luminance position, to one of the two second sub-pixels; and
applies a third input-versus-output luminance characteristic, in which output luminance rises from a third input luminance position which is higher in position than the second input luminance position, to the other one of the two second sub-pixels,
thereby performing the space-divisional-driving which allows each of the first and the two second sub-pixels to be driven separately.

3. The liquid crystal display apparatus according to claim 2, wherein each of the pixels includes:
a first switching element for driving the first sub-pixel; a second switching element for driving the sub-pixel group;
a capacitive element provided between the second switching element and the other one of the two second sub-pixels, and
the driving means performs the space-divisional-driving on the first and the two second sub-pixels through using a first look-up table in which input luminance level of the video signal is associated with output luminance level to be applied to the first sub-pixel and output luminance level to be applied to the sub-pixel group.

4. The liquid crystal display apparatus according to claim 3, wherein the driving means drives each of the pixels in a line-sequential manner, and
a single gate line and two data lines are provided in correspondence with each of pixels, the gate line selecting a pixel to be driven in the line-sequential manner, the two data lines supplying the drive voltage to the pixel to be driven.

5. The liquid crystal display apparatus according to claim 3, wherein the driving means drives each of the pixels in a line-sequential manner, and
two gate lines and a single data line are provided in correspondence with each of pixels, the two gate lines selecting a pixel to be driven in the line-sequential manner, the single data line supplying the drive voltage to the pixel to be driven.

6. The liquid crystal display apparatus according to claim 2, wherein each of the pixels includes three switching elements for driving the first and the two second sub-pixels, respectively, and
the driving means performs the space-divisional-driving on the first and the two second sub-pixels through using a second look-up table in which input luminance level of the video signal is associated with output luminance level to be applied to the first sub-pixel and output luminance level to be applied to each of the two second sub-pixels.

7. The liquid crystal display apparatus according to claim 1, wherein the area of the first sub-pixel is equal to or less than ⅓ of whole area of the pixel.

8. The liquid crystal display apparatus according to claim 7, wherein the following equation (1) is satisfied, where 'Sa' is area of the first sub-pixel, 'Sb1' is area of one of the two second sub-pixels, and 'Sb2' is area of the other one of the two second sub-pixels $$Sa<Sb1<Sb2 \quad (1).$$

9. The liquid crystal display apparatus according to claim 1, wherein the driving means performs the space-divisional-driving while executing overdrive process on the drive voltage of each of the first and the second sub-pixels so that an overdrive level for the first sub-pixel is different from that for the sub-pixel group.

10. The liquid crystal display apparatus according to claim 1, wherein the liquid crystal element includes a liquid crystal in a vertical alignment (VA) mode.

11. A liquid crystal display apparatus comprising:
a plurality of pixels arranged in a matrix as a whole and each having a liquid crystal element, each of the pixels including a first sub-pixel and a sub-pixel group having a plurality of second sub-pixels, a lower gray level voltage being applied to the first sub-pixel, and higher gray level voltages with different values being applied to the second sub-pixels, respectively; and a driving section for driving the liquid crystal elements in the pixels by applying drive voltage based on a video signal, wherein area of the first sub-pixel is smaller than whole area of the sub-pixel group, the driving section drives each of the pixels based on the video signal in a manner of space-divisional-driving which allows each of the first and the second sub-pixels to be driven separately, the sub-pixel group includes two sub-pixels so that each of the pixels has three respective sub-pixels which include a respective first sub-pixel and respective two second sub-pixels such that the three respective sub-pixels for each pixel are separate or distinct from the sub-pixels of other pixels, and the driving section drives each second sub-pixel of the respective two second sub-pixels with a different drive voltage.

12. A liquid crystal display apparatus comprising:

a plurality of pixels arranged in a matrix as a whole and each having a liquid crystal element, each of the pixels including a first sub-pixel and a sub-pixel group having a plurality of second sub-pixels, a lower gray level voltage being applied to the first sub-pixel, and higher gray level voltages with different values being applied to the second sub-pixels, respectively; and a driving section for driving the liquid crystal elements in the pixels by applying drive voltage based on a video signal, wherein area of the first sub-pixel is smaller than whole area of the sub-pixel group, the driving section drives each of the pixels based on the video signal in a manner of space-divisional-driving which allows each of the first and the second sub-pixels to be driven separately, and the sub-pixel group includes three sub-pixels so that each of the pixels has four respective sub-pixels which include a respective first sub-pixel and respective three second sub-pixels such that the four respective sub-pixels for each pixel are separate or distinct from the sub-pixels of other pixels.

* * * * *